United States Patent [19]
Carpenter et al.

[11] Patent Number: 6,067,611
[45] Date of Patent: May 23, 2000

[54] NON-UNIFORM MEMORY ACCESS (NUMA) DATA PROCESSING SYSTEM THAT BUFFERS POTENTIAL THIRD NODE TRANSACTIONS TO DECREASE COMMUNICATION LATENCY

[75] Inventors: Gary Dale Carpenter, Pflugerville; Mark Edward Dean; David Brian Glasco, both of Austin; Richard Nicholas Iachetta, Pflugerville, all of Tex.

[73] Assignee: International Business Machines Corporation, Armonk, N.Y.

[21] Appl. No.: 09/106,945

[22] Filed: Jun. 30, 1998

[51] Int. Cl.⁷ ................................ G06F 15/16
[52] U.S. Cl. .................. 712/28; 709/201; 709/213; 709/238; 710/104; 711/128; 711/146
[58] Field of Search ................. 711/141, 129, 711/130, 122; 712/28; 710/104

[56] References Cited

U.S. PATENT DOCUMENTS

| | | | |
|---|---|---|---|
| 5,535,116 | 7/1996 | Gupta et al. | 364/134 |
| 5,673,413 | 9/1997 | Deshpande et al. | 711/141 |
| 5,878,268 | 3/1999 | Hagersten | 712/28 |
| 5,887,146 | 3/1999 | Baxter et al. | 710/104 |
| 5,893,144 | 4/1999 | Wood et al. | 711/122 |

*Primary Examiner*—Richard L. Ellis
*Assistant Examiner*—Nabil El-Hady
*Attorney, Agent, or Firm*—Casimer K. Salys; Brian F. Russell; Andrew J. Dillon

[57] ABSTRACT

A non-uniform memory access (NUMA) computer system includes an interconnect to which multiple processing nodes (including first, second, and third processing nodes) are coupled. Each of the first, second, and third processing nodes includes at least one processor and a local system memory. The NUMA computer system further includes a transaction buffer, coupled to the interconnect, that stores communication transactions transmitted on the interconnect that are both initiated by and targeted at a processing node other than the third processing node. In response to a determination that a particular communication transaction originally targeting another processing node should be processed by the third processing node, buffer control logic coupled to the transaction buffer causes the particular communication transaction to be retrieved from the transaction buffer and processed by the third processing node. In one embodiment, the interconnect includes a broadcast fabric, and the transaction buffer and buffer control logic form a portion of the third processing node.

14 Claims, 6 Drawing Sheets

NON-UNIFORM MEMORY ACCESS (NUMA) DATA PROCESSING SYSTEM THAT BUFFERS POTENTIAL THIRD NODE TRANSACTIONS TO DECREASE COMMUNICATION LATENCY

BACKGROUND OF THE INVENTION

1. Technical Field

The present invention relates in general to a method and system for data processing and, in particular, to a non-uniform memory access (NUMA) data processing system and method of communication in a NUMA data processing system. Still more particularly, the present invention relates to a NUMA data processing system and method of communication in which potential third node transactions are buffered to reduce communication latency.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. Because all data accesses can potentially trigger a coherency or data request transaction on the nodal interconnect, the latency associated with the transmission of requests to remote nodes and transmission of the responses from the remote nodes can dramatically influence overall system performance. As should thus be apparent, it would be desirable to provide a CC-NUMA computer system having low inter-node communication latency.

SUMMARY OF THE INVENTION

It is therefore one object of the present invention to provide an improved method and system for data processing.

It is another object of the present invention to provide an improved NUMA data processing system and method of communication in a NUMA data processing system.

It is yet another object of the present invention to provide an improved NUMA data processing system and method of communication in which potential third node transactions are buffered to reduce communication latency.

The foregoing objects are achieved as is now described. A non-uniform memory access (NUMA) computer system is provided that includes an interconnect to which first, second, and third processing nodes are coupled. Each of the first, second, and third processing nodes includes at least one processor and a local system memory. The NUMA computer system further includes a transaction buffer, coupled to the interconnect, that stores communication transactions transmitted on the interconnect that are both initiated by and targeted at a processing node other than the third processing node. In response to a determination that a particular communication transaction originally targeting another processing node should be processed by the third processing node, buffer control logic coupled to the transaction buffer causes the particular communication transaction to be retrieved from the transaction buffer and processed by the third processing node. In one embodiment, the interconnect includes a broadcast fabric, and the transaction buffer and buffer control logic form a portion of the third processing node.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
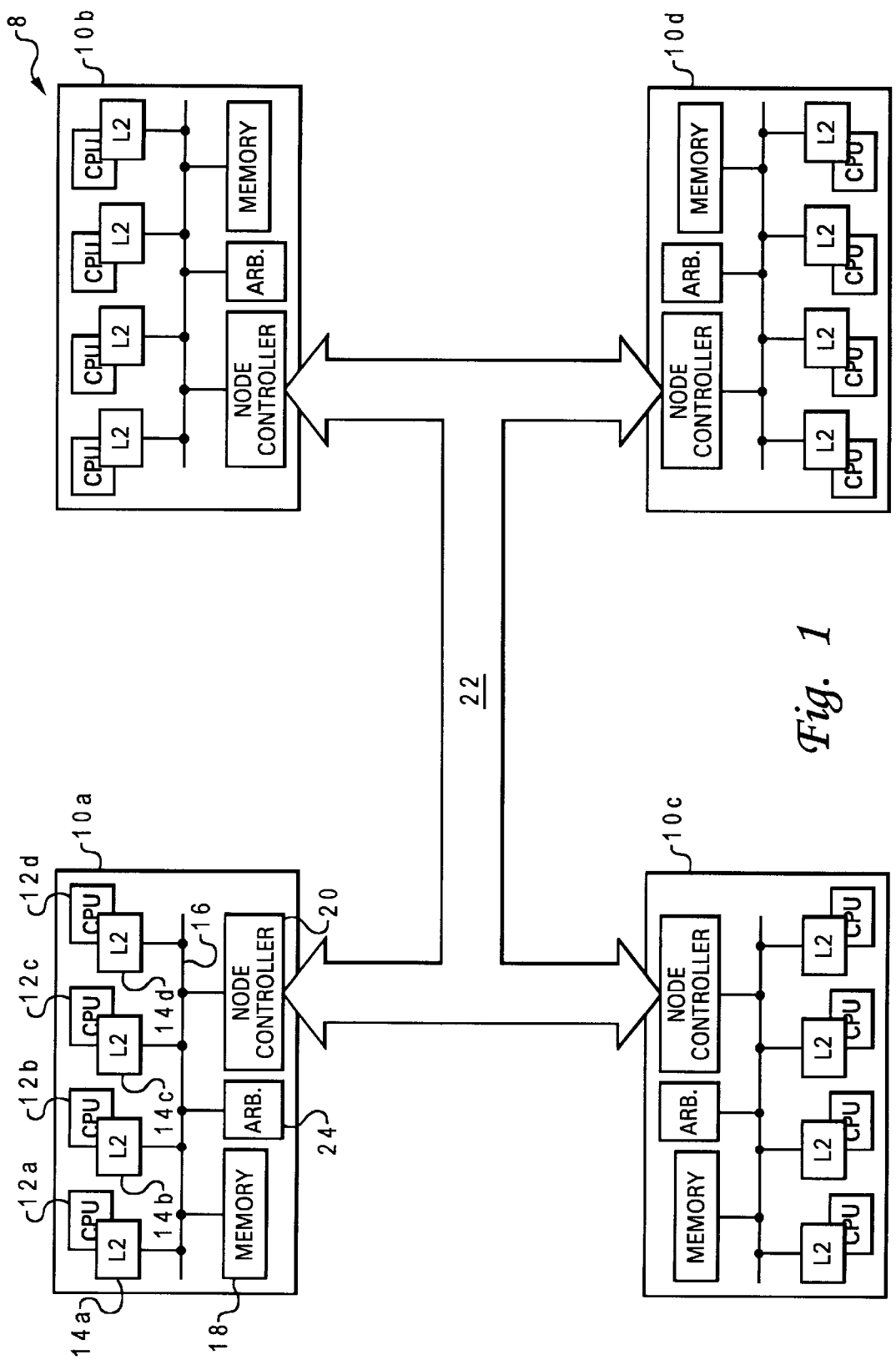
FIG. 1 depicts an illustrative embodiment of a NUMA computer system with which the present invention may advantageously be utilized.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 8 includes a number (N) of processing nodes 10a–10d, which are interconnected by node interconnect 22. Processing nodes 10a–10d each include at least one, and up to M, processors 12. Processors 12a–12d are preferably identical and may comprise a processor within the PowerPC™ line of processors available from International Business Machines (IBM) Corporation of Armonk, N.Y. In addition to the registers, instruction flow logic and execution units utilized to execute program instructions, each of processors 12a–12d also includes an on-chip level one (L1) cache (not illustrated), which together with a respective one of level two (L2) caches 14a–14d is utilized to stage data to the associated processor 12 from system memories 18. In other words, the L1 caches and L2 caches 14a–14d function as intermediate storage between the system memories 18 and processors 12 that temporarily buffer data that are likely to be accessed by the associated processor 12. L2 caches 14 typically have a much larger storage capacity than the L1 caches, but at a longer access latency. For example, L2 caches 14a–14d may have a storage capacity of 1–16 megabytes (MB), while the on-chip L1 caches may have a storage capacity of 8–32 kilobytes. Although L2 caches 14a–14d are illustrated in FIG. 1 as external to processors 12, it should be understood that L2 caches 14a–14d could alternatively be incorporated within the associated processor 12 as an additional level of on-chip cache memory. Furthermore, it should be understood that one or more additional levels of cache memory (L3, L4, etc.) could be utilized to provide additional data storage. In the following discussion, each processor 12 and its associated cache hierarchy (L1, L2, etc.) is considered to be a single snooper.

As shown, processing nodes 10a–10d further include a respective node controller 20, which, together with system memory 18 and L2 caches 14a–14d, is coupled to local interconnect 16. Each node controller 20 serves as a local agent for remote processing nodes 10 by performing at least two functions. First, node controllers 20 snoop the associated local interconnect 16 and facilitate the transmission of local communication transactions to remote processing nodes 10. Second, node controllers 20 snoop communication transactions on node interconnect 22 and master relevant communication transactions on the associated local interconnect 16. Communication on each local interconnect 16 is controlled by an arbiter 24. As discussed further below, arbiters 24 regulate access to local interconnects 16 based on bus request signals generated by processors 12 and compile coherency responses for snooped communication transactions on local interconnects 16.

Of course, NUMA computer system 8 can further include additional devices that are not necessary for an understanding of the present invention and are accordingly omitted in order to avoid obscuring the present invention. For example, each node 10 may also support I/O devices (e.g., a display device, keyboard, or graphical pointer), non-volatile storage for storing an operating system and application software, and serial and parallel ports for connection to networks or attached devices.

Memory Organization

All of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. For example, for the illustrative embodiment of the present invention shown in FIG. 1, processors 12 address a 16 gigabyte (GB) address space including both a general purpose memory area and a reserved area. The general purpose memory area is divided into 500 MB segments, with each of the four processing nodes 10 being allocated every fourth segment. The reserved area, which may contain approximately 2 GB, includes system control and peripheral memory and I/O areas that are each allocated to a respective one of processing nodes 10.

For purposes of the present discussion, the processing node 10 that stores a particular datum in its system memory 18 is said to be the home node for that datum; conversely, others of processing nodes 10–10d are said to be remote nodes with respect to the particular datum.

Memory Coherency

Because data stored within each system memory 18 can be requested, accessed, and modified by any processor 12 within NUMA computer system 8, NUMA computer system 8 implements a cache coherency protocol to maintain coherency both between caches in the same processing node and between caches in different processing nodes. Thus, NUMA computer system 8 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that L1 caches, L2 caches 14b, and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 can each be implemented with any broadcast or point-to-point interconnect architecture, for example, a bus or crossbar switch. However, in a preferred embodiment, each of local interconnects 16 and node interconnect 22 is implemented as a hybrid-bus architecture governed by the 6xx communication protocol developed by IBM Corporation.

Figure 2A:
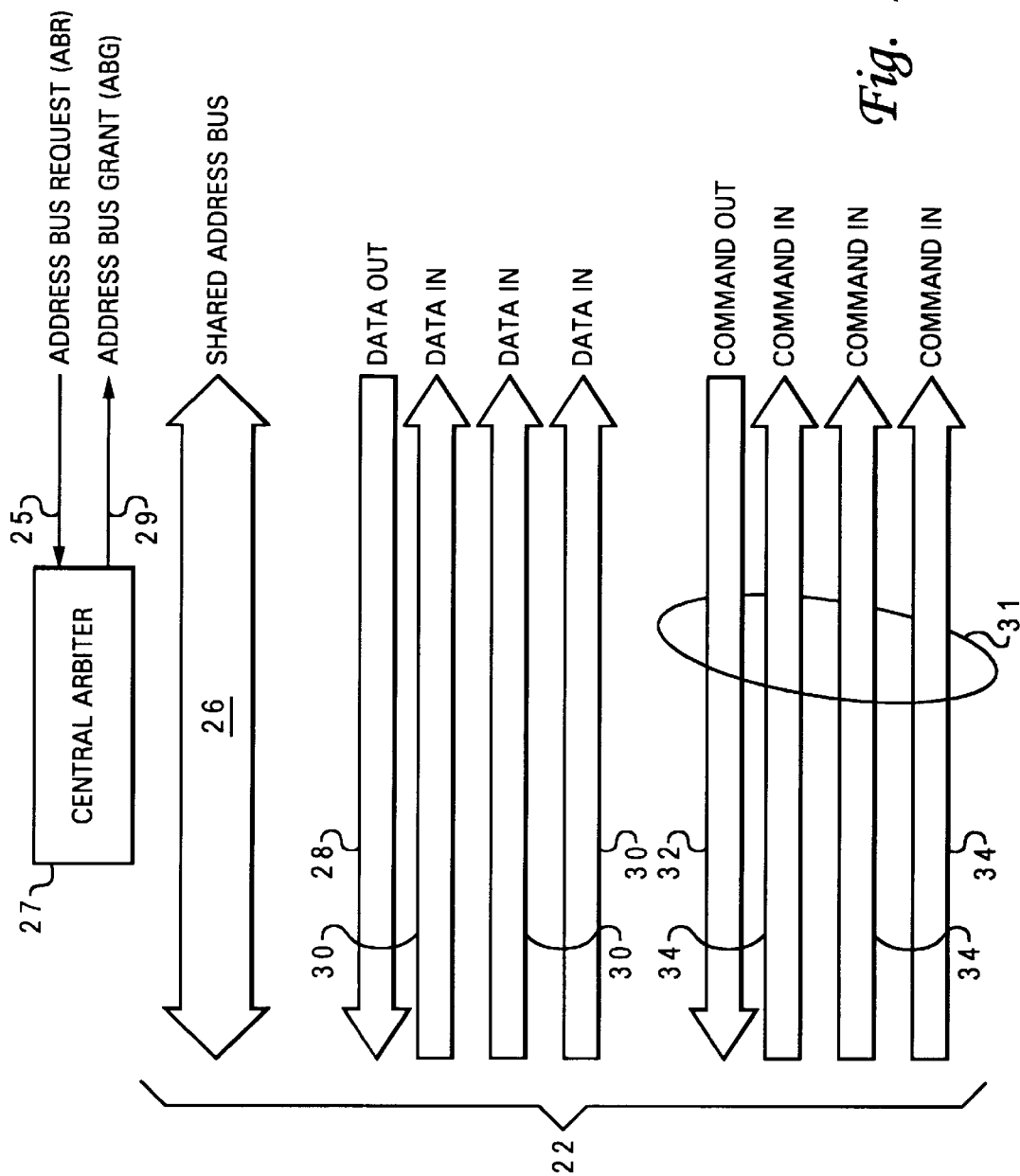
FIG. 2A is a more detailed block diagram of an interconnect architecture utilized in the illustrative embodiment shown in FIG. 1.

Referring now to FIG. 2A, a preferred embodiment of node interconnect 22 within NUMA computer system 8 is illustrated from the perspective of one of processing nodes 10. As shown, the illustrated embodiment of node interconnect 22 includes separate (i.e., non-multiplexed) address and data portions, which are decoupled to permit split transactions. The address portion of node interconnect 22 is implemented as a shared address bus 26, access to which is controlled by central arbiter 27. A node controller 20 requests access to shared address bus 26 by asserting its respective address bus request (ABR) signal 25 and is informed of a grant of access by central arbiter 27 through the assertion of its respective address bus grant (ABG) signal 29. Each node controller 20 coupled to node interconnect 22 also snoops all communication transactions on shared address bus 26 to support memory coherency, as discussed further below. A summary of relevant signal names and definitions for shared address bus 26 is given in Table I.

TABLE I

| Signal Name | No. of lines | Description |
| --- | --- | --- |
| Address <0:7> | 8 | Address bus modifiers defining attributes of a communication transaction for coherency, write thru, and protection |
| Address <8:15> | 8 | Tag used to identify a communication transaction |
| Address <16:63> | 48 | Address signals that indicate the physical, virtual or I/O address in a request |
| AParity <0:2> | 3 | Indicates parity for address bits <0:63> |
| TDescriptors | 10 | Indicate size and type of communication transaction |

The utilization of shared address bus 26 is preferably enhanced by implementing shared address bus 26 as a pipelined bus, meaning that a subsequent transaction can be sourced by a processing node 10 prior to the master of a previous communication transaction receiving coherency responses from each of the other processing nodes 10.

While the data portion of node interconnect 22 could also be implemented as a shared bus, the data portion of node interconnect 22 is preferably implemented as a distributed switch having N−1 (e.g., 4−1=3) data-in channels 34 and a single data-out channel 32 for each processing node 10. The data output by a processing node 10 on data-out channel 32 are transmitted to all of processing nodes 10, and each processing node 10 receives data from each of the other processing nodes 10 via data-in channels 34. By implementing the data portion of node interconnect 22 in this manner rather than as a shared bus, deadlocks are avoided and data bandwidth is advantageously increased. The relevant signal names and definitions for each channel within the preferred embodiment of the data portion of node interconnect 22 are summarized below in Table II.

TABLE II

| Signal Name | No. of lines | Description |
| --- | --- | --- |
| Data <0:127> | 128 | Data lines used to carry data for read and write transactions |
| Data parity <0:15> | 16 | Indicate parity for data lines <0:127> |
| DTag <0:7> | 8 | Tag used to match a data packet with an address bus transaction |
| DValid <0:1> | 2 | Indicate if valid information is present on Data and DTag lines |

As indicated in Table II, to permit recipients of data packets to determine the communication transaction to which each data packet belongs, each data packet is identified with a transaction tag. This permits the timings of shared address bus 26 and the data portion of node interconnect 22 to be completely decoupled, meaning that no fixed timing relationship exists between address tenures and data tenures and that data tenures can be ordered differently than the corresponding address tenures. Those skilled in the art will appreciate that data flow control logic and associated flow control signals should be utilized to regulate use of the finite data communication resources.

As illustrated in FIG. 2A, a preferred embodiment of node interconnect 22 also includes a high speed I-command channel 31. This sideband channel, like the data portion of node interconnect 22, is preferably implemented as a distributed switch including one output channel (command-out channel 32) and N−1 input channels (command-in channels 34) for each processing node 10.

Figure 2B:
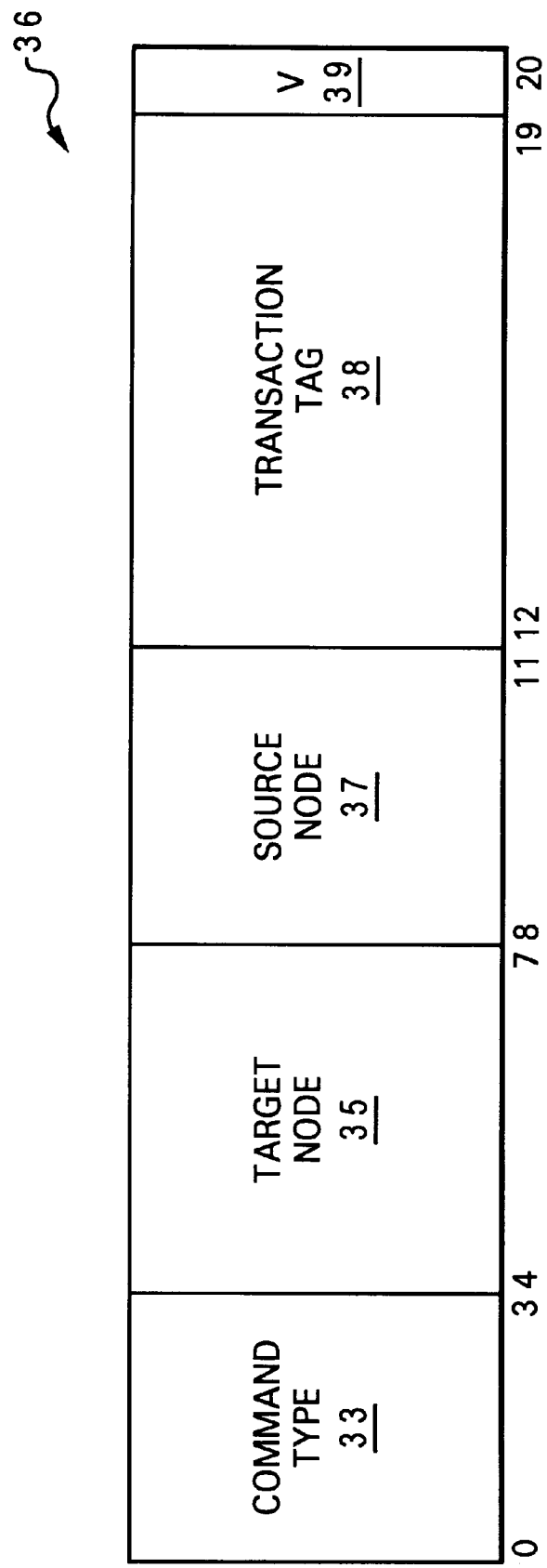
FIG. 2B depicts an illustrative embodiment of an I-command.

Channels 32 and 34 permit the communication of I-commands between processing nodes 10 without creating additional loading on the address or data portions of node interconnect 22. An exemplary embodiment of an I-command is shown in FIG. 2B. As illustrated, I-command 36 includes five (5) fields: a 4-bit command type field 33, an N-bit (e.g., 4-bit) target node field 35, an N-bit source node field 37, a transaction tag field 38, and a valid (V) field 39. Command type field 33 provides an encoded indication of the type of I-command 36. Some of the possible I-commands that can be encoded within type field 33 are listed below in Table III.

TABLE III

| I-command groups | I-command types | Meaning |
| --- | --- | --- |
| commands | 3rd node run | Run buffered transaction at third (target) node |
|  | Error | Error detected in transaction |
|  | Reissue | Reissue transaction to source node |
| coherency responses | Retry | Retry transaction - usually for flow control reasons |
|  | Modified intervention | Line is modified in cache and will be sourced to target node |
|  | Shared | Line is held shared in cache |
|  | Null | Line is invalid in cache |

For each type of I-command, the recipient is specified in target node field 35, the sending node is specified in source node field 37, and the transaction to which the I-command relates is specified within transaction tag field 38. The validity of I-command 36 is indicated by valid (V) field 39. Importantly, the I-commands issued by processing nodes 10 via I-command channel 31 do not have any necessary timing relationship with the address or data tenures of the associated communication transactions. And, because I-command channel 31 utilizes small packets and is non-blocking (i.e., use of I-command channel 31 by one processing node 10 does not inhibit or block usage by other processing nodes), I-commands can be transmitted at high speed between processing nodes 10.

Like node interconnect 22, local interconnects 16 include three distinct components—an address portion, a data portion, and a coherency portion. The address portion of each local interconnect 22 is preferably implemented as described above with respect to shared address bus 26 of node interconnect 22. The data portion of each local interconnect 16 utilizes the same data signals listed above in Table II, but is preferably implemented as a shared data bus rather than a distributed switch (although either could be utilized). In lieu of the I-command channel discussed above, the coherency portion of each local interconnect 16 includes signal lines coupling each attached snooper to the local arbiter 24. The signal lines within local interconnects 16 that are utilized for coherency communication are summarized below in Table IV.

TABLE IV

| Signal Name | No. of lines | Description |
| --- | --- | --- |
| AStatOut <0:1> | 2 | Encoded signals asserted by each bus receiver to indicate flow control or error information to arbiter |
| AStatIn <0:1> | 2 | Encoded signals asserted by arbiter in response to tallying the AStatOut signals asserted by the bus receivers |
| ARespOut <0:2> | 3 | Encoded signals asserted by each bus receiver to indicate coherency information to arbiter |
| ARespIn <0:2> | 3 | Encoded signals asserted by arbiter in response to tallying the ARespOut signals asserted by the bus receivers |

In contrast to the coherency responses transmitted between processing nodes 10 via I-command channel 31, coherency responses transmitted via the AResp and AStat lines of local interconnects 16 preferably have a fixed but programmable timing relationship with the associated address bus transactions. For example, the AStatOut votes, which provide a preliminary indication of the response of each snooper to a communication transaction on the local address bus, may be required in the second cycle following receipt of a request on the local address bus. Arbiter 24 compiles the AStatOut votes and then issues the AStatIn vote a fixed but programmable number of cycles later (e.g., 1 cycle). Possible AStat votes are summarized below in Table V.

TABLE V

| AStat vote | Meaning |
| --- | --- |
| Null | Idle |
| Ack | Transaction accepted by snooper |

TABLE V-continued

| AStat vote | Meaning |
| --- | --- |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed above in Table III. In addition, the possible AResp votes include "ReRun," which is issued (usually by a node controller 20) to indicate that the snooped request has a long latency and that the source of the request will be instructed to reissue the transaction at a later time. Thus, in contrast to a retry response, a ReRun response makes the recipient of a transaction that voted ReRun (and not the originator of the transaction) responsible for causing the communication transaction to be reissued at a later time.

Node Controller

Figure 2C:
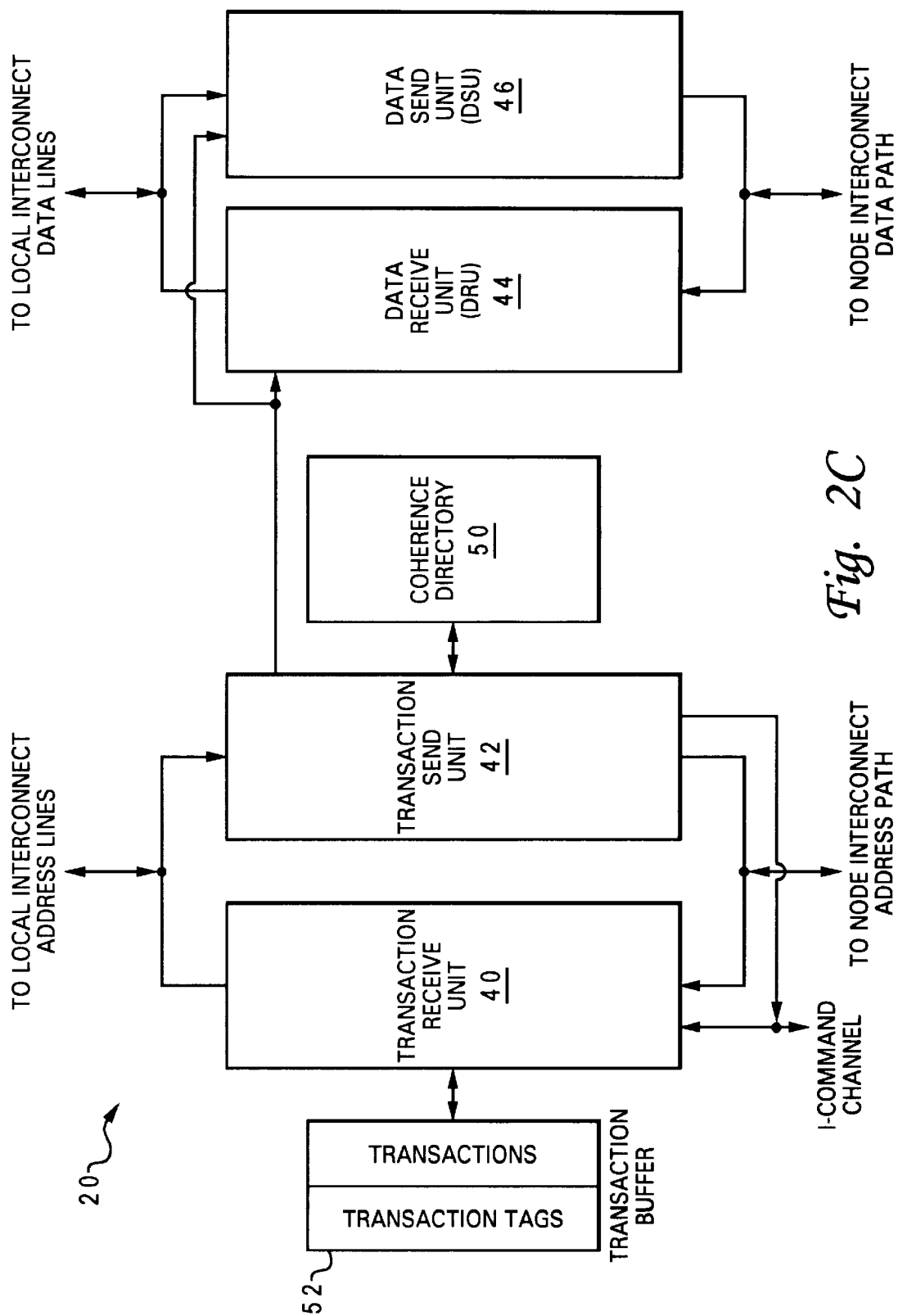
FIG. 2C is a more detailed block diagram of the node controller shown in FIG. 1.

Referring now to FIG. 2C, there is illustrated a more detailed block diagram of a node controller 20 in NUMA computer system 8 of FIG. 1. As shown in FIG. 2C, each node controller 20, which is coupled between a local interconnect 16 and node interconnect 22, includes transaction receive unit 40, transaction send unit 42, a data receive unit (DRU) 44, and a data send unit (DSU) 46. Transaction receive unit 40, transaction send unit 42, DRU 44 and DSU 46 can be implemented, for example, with field programmable gate arrays (FPGAS) or application specific integrated circuits (ASICs). As indicated, the address and data paths through node controller 20 are bifurcated, with address signals being processed by transaction receive unit 40 and transaction send unit 42 and data signals being processed by DSU 44 and DRU 46.

Transaction receive unit 40, which is so designated to indicate transaction flow off of node interconnect 22, is responsible for receiving I-commands from I-command channel 31, accepting transactions and responses from node interconnect 22, issuing received transactions on local interconnect 16, and forwarding responses to transaction send unit 42. Transaction receive unit 40 is also responsible for maintaining transaction buffer 52. Transaction buffer 52 is an associative buffer in which transaction receive unit 40 stores communication transactions snooped on shared address bus 26 that are sourced by and targeted at processing nodes 10 other than the local processing node. Each entry in transaction buffer 52 stores a communication transaction in association with a transaction tag (i.e., address bits <8:15>) so that the communication transactions can be rapidly accessed, as discussed below with respect to FIG. 4.

Transaction send unit 42, which as indicated by its nomenclature is a conduit for transactions flowing onto node interconnect 22, interacts with transaction receive unit 40 to process memory request transactions and issues commands to DRU 44 and DSU 46 to control the transfer of data between local interconnect 16 and the data portion of node interconnect 22. Transaction send unit 42 also implements the selected (i.e., MSI) coherency protocol for node interconnect 22 and maintains coherence directory 50.

Coherence directory 50 stores indications of the system memory addresses of data (e.g., cache lines) checked out to caches in remote nodes for which the local processing node is the home node. The address indication for each datum is stored in association with an identifier of each processing node having a copy of the datum and the coherency status of the datum at each such processing node. Possible coherency states for entries in coherency directory 50 are summarized in Table VI.

TABLE VI

| Coherence directory state | Possible state(s) in local cache | Possible state(s) in remote cache | Meaning |
|---|---|---|---|
| Modified (M) | I | M,E, or I | Cache line may be modified at a remote node with respect to system memory at home node |
| Shared (S) | S or I | S or I | Cache line may be held non-exclusively at remote node |
| Invalid (I) | M,E,S, or I | I | Cache line is not held by any remote node |
| Pending-shared | S or I | S or I | Cache line is in the process of being invalidated at remote nodes |
| Pending-modified | I | M,E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

Prior Art "Third Node" Communication Scenario

Figure 3A:
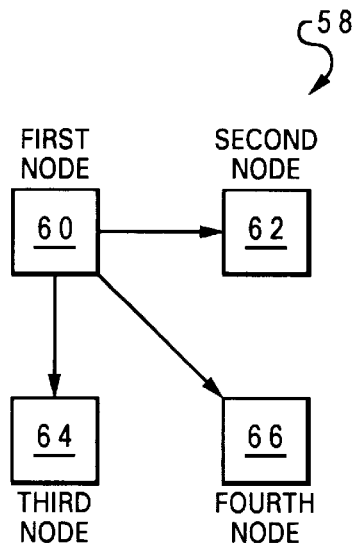
FIGS. 3A–3D illustrate a third node communication scenario in accordance with the prior art.

With reference now to FIGS. 3A–3D, there is depicted an exemplary "third node" communication scenario within a NUMA computer system in accordance with the prior art. As shown, conventional NUMA computer system 58 includes first, second, third, and fourth nodes, which are respectively illustrated at reference numerals 60, 62, 64, and 66. Assuming that second node 62 is the home node for data that is held exclusively (i.e., in E or M state) by third node 64, first node 60 requests the data by broadcasting a read request on the node interconnect. As shown in FIG. 3A, the request transaction is received by second node 62, third node 64, and fourth node 66; however, because the requested data is owned by second node 62, third node 64 and fourth node 66 filter out (i.e., ignore) the data request. In response to receipt of the request transaction, second node 62 checks its node directory to determine if a copy of the requested data is held within a remote node. Because the requested data is recorded in the node directory of second node 62 as held exclusively by a remote node, second node 62 is unable to immediately respond to the request transaction received from first node 60. This is because the copy of the requested data at second node 62 may be stale (i.e., a processor in third node 64 may have modified the requested data).

Figure 3B:
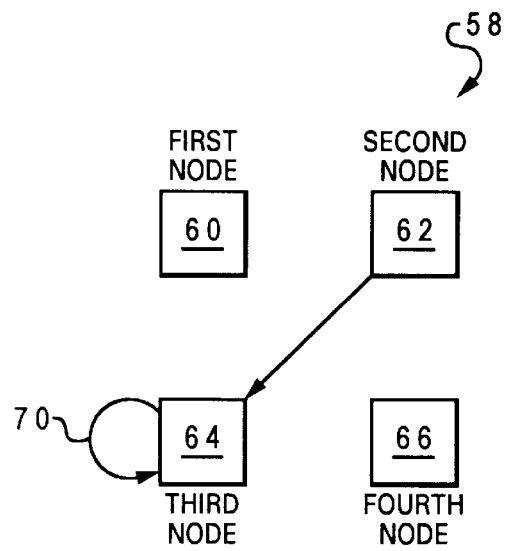
Figure 3C:
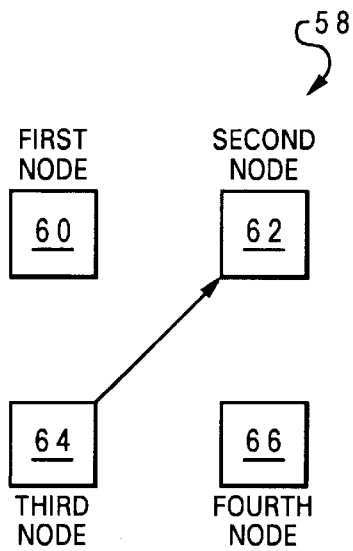

Accordingly, as shown in FIG. 3B, second node 62 issues to third node 64, via the node interconnect, a request transaction specifying the address of the requested data. As indicated by arrow 70, in response to the request transaction third node 64 forwards the request transaction to internal caches that may store the requested data. The internal cache holding the requested data exclusively responds with a shared coherency response, indicating that the cache will update the coherency state of the requested data to S state. Then, as shown in FIG. 3C, third node 64 transmits a shared response to second node 62, informing second node 62 that the coherency state of the copy of the requested data held by third node 64 is being updated to the shared state.

Figure 3D:
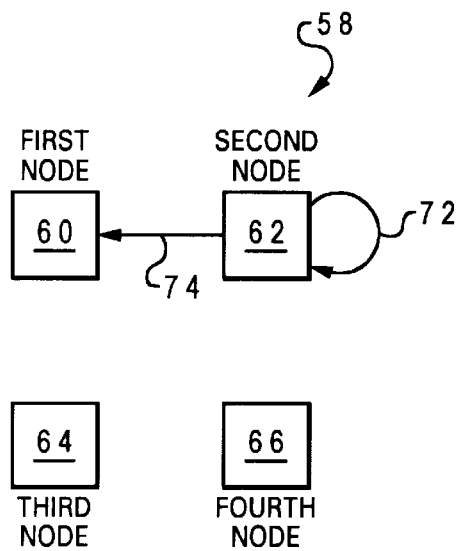

Finally, referring to FIG. 3D, in response to receipt of the shared response from third node 64, second node 62 is able to process the request transaction as illustrated by arrow 72. The requested data is then sourced to first node 60 with a shared coherency state, as indicated by arrow 74. While this conventional third node communication scenario ensures data coherency between nodes in a NUMA computer system, it should be noted that the same communication transaction is transmitted to third node 64 twice, as shown in FIGS. 3A and 3B. The present invention advantageously eliminates this redundant communication via the node interconnect, thereby reducing communication latency and enhancing the scalability of a NUMA computer system.

Innovative Third Node Communication Scenario

Figure 4:
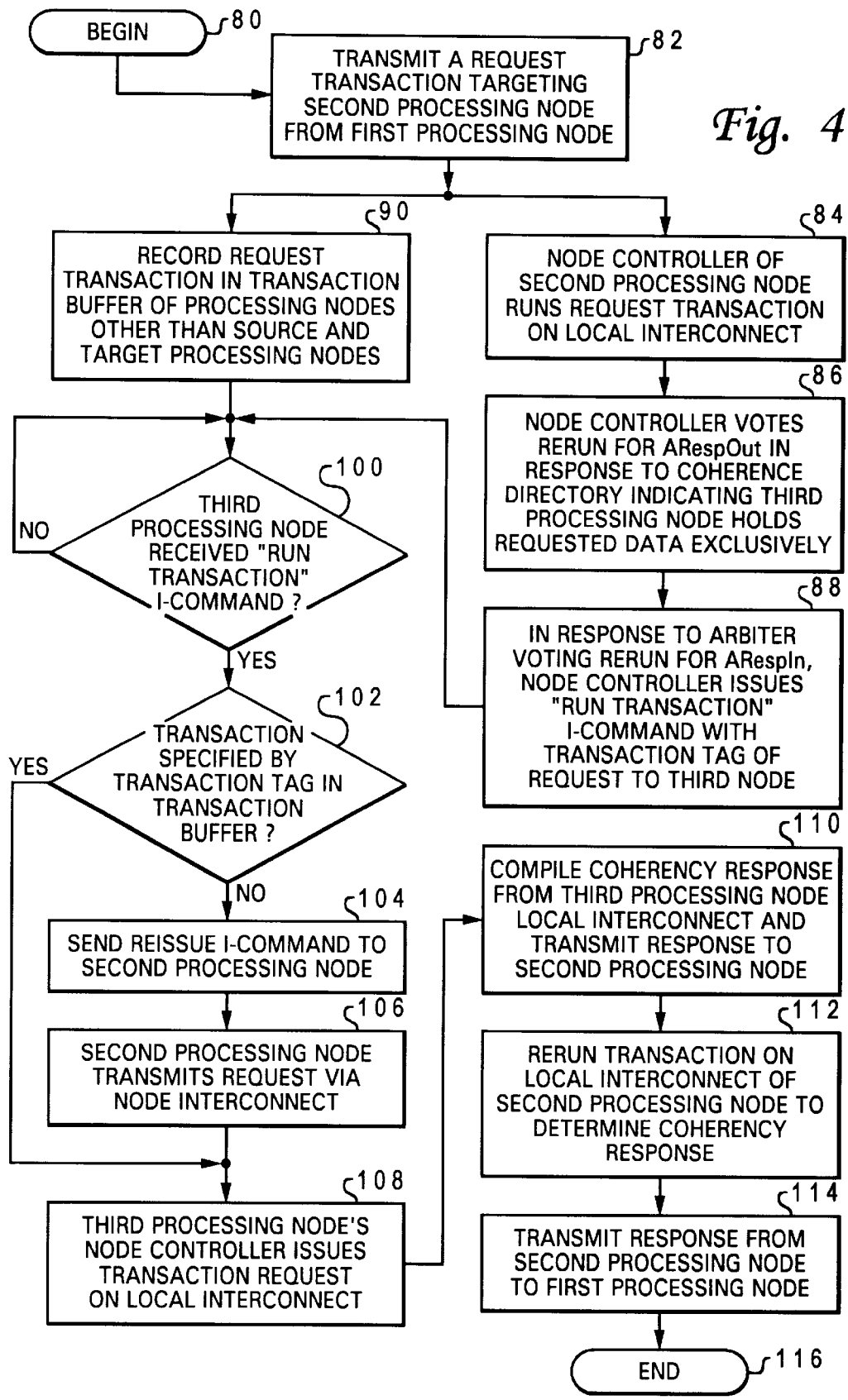
FIG. 4 is a high level logical flowchart of a third node communication methodology in accordance with the present invention.

Referring now to FIG. 4, there is illustrated a high level logical flowchart of a third node communication methodology in accordance with the present invention. The flowchart shown in FIG. 4 assumes the same initial conditions as the exemplary prior art scenario discussed supra, namely, that one of processors 12a–12d has issued a read request for a cache line that is held exclusively by processing node 10c and has processing node 10b as a home node.

As depicted, the process begins at block 80 and thereafter proceeds to block 82, which illustrates the node controller 20 of processing node 10a transmitting, via shared address bus 26 of node interconnect 22, a communication transaction requesting data at a specified address. Because shared address bus 26 is a broadcast medium in the preferred embodiment, the request transaction is received by each of processing nodes 10b, 10c and 10d. Following block 82, the process proceeds both to blocks 84–88 and to block 90.

Blocks 84–88 illustrate the processing performed by processing node 10b (i.e., the home node of the requested cache line) in response to receipt of the request transaction on shared address bus 26. First, as shown at block 84, node controller 20 of processing node 10b arbitrates for ownership of its local interconnect 16 and masters the request transaction on local interconnect 16. The process then proceeds to block 86, which depicts node controller 20 of processing node 10b voting ReRun for its ARespOut coherency response to the request transaction. The ReRun vote indicates that transaction send unit 42 has determined by reference to coherence directory 50 that the coherency state of the requested cache line cannot be resolved without involving a third processing node, namely, processing node 10c, which holds the requested data exclusively. As shown at block 88, in response to arbiter 24 of local interconnect 16 voting ReRun for ARespIn, transaction send unit 42 within node controller 20 of processing node 10b issues to processing node 10c, via I-command channel 31, a "3rd node run" I-command in conjunction with the transaction tag of the original request transaction issued by processing node 10a. Because the I-command is transmitted via sideband I-command channel 31 rather than the address or data portions of node interconnect 22, the address bandwidth of node interconnect 22 that would otherwise be consumed can be advantageously utilized to communicate other transactions. In this manner, communication latency on the blocking, bandwidth-limited portions of node interconnect 22 is reduced. Following block 88, the process passes to block 100, which is described below.

Block 90 illustrates the processing triggered at processing nodes 10c and 10d, which are each neither the source nor target of the request transaction, in response to receipt of the request transaction issued by processing node 10a. As indicated, transaction receive unit 40 within each of processing nodes 10c and 10d stores the request transaction and transaction tag in an entry within its respective transaction buffer 52. In a preferred embodiment, not all snooped transactions are stored in the transaction buffers 52 of third nodes (i.e., processing nodes that are neither the source nor the target of a transaction). Instead, in order to conserve the limited storage capacity of transaction buffers 52, only transactions identified by address signal lines <0:7>and the TDescriptors as transactions that could possibly require third node involvement are buffered. Of course, other optimizations to improve the storage efficiency of limited-size transaction buffers 52 are possible, such as storing only those transactions that would entail the use of greater than a threshold amount of communication resources for retransmission if not buffered.

The process proceeds from block 90 to block 100, which illustrates a determination of whether or not processing node 10c, the third node, has received a "3rd node run" I-command. If not, the process illustrated in FIG. 4 iterates at block 100 until a "3rd node run" I-command is received by processing node 10c. Of course, during the interval between the recordation of the request transaction by processing node 10c in transaction buffer 52 and the receipt of a "3rd node run" I-command by processing node 10c, processing nodes 10a–10d can initiate, receive and process other communication transactions. Then, in response to a determination at block 100 that processing node 10c has received a "3rd node run" I-command, the process passes to block 102.

Block 102 illustrates a determination by transaction receive unit 40 within node controller 20 of processing node 10c whether or not a transaction tag matching the transaction tag received via I-command channel 31 is stored within transaction buffer 52. Depending upon the size of transaction buffer 52 and the number of communication transactions received by processing node 10c between steps 90 and 102, the transaction specified by the transaction tag may no longer be stored within transaction buffer 52 due to its limited size. If a transaction having a matching transaction tag is stored within transaction buffer 52, the process proceeds from block 102 to block 108, which is described below. However, in response to a determination that the transaction tag received via I-command channel 31 does not match any of the transactions tags in transaction buffer 52, the process proceeds to block 104. Block 104 depicts processing node 10c transmitting a "Reissue" I-command to processing node 10b via I-command channel 31 in conjunction with the received transaction tag. As shown at block 106, in response to receipt of the "Reissue" I-command, processing node 10b retransmits the communication transaction to processing node 10c via shared address bus 26 of node interconnect 22, as described above with respect to FIG. 3B. Thus, in the statistically unlikely event that the relevant communication transaction is not stored in transaction buffer 52 of processing node 10c, NUMA computer system 8 handles a third node communication scenario like conventional NUMA computer system 58.

The process proceeds from either block 102 or block 106 to block 108, which illustrates transaction receive unit 40 within node controller 20 of processing node 10c mastering the request transaction (which was accessed from transaction buffer 52 or received from processing node 10b) on local interconnect 16 of processing node 10c. In response to the request transaction, each of the snoopers attached to node interconnect 16 votes a coherency response during the ARespOut period. The snooper holding the requested data exclusively votes shared during the ARespOut period and initiates an update to the coherency status of the requested cache line to S state; meanwhile, other snoopers vote null. As depicted at block 110, bus arbiter 24 of processing node 10c compiles these coherency responses and issues a shared coherency response during the ARespIn period. In response to receipt of the shared ARespIn coherency response, transaction send unit 42 within node controller 20 transmits an I-command containing a shared response and the transaction tag to processing node 10b via I-command channel 31. The process then proceeds to block 112, which depicts node controller 20 of processing node 10b ReRunning the request transaction on local interconnect 16 of processing node 10b. In response to snooping the ReRun request transaction, node controller 20 of processing node 10b votes shared during the ARespOut period, indicating that processing node 10c holds the requested data in shared state. Bus arbiter 24 of processing node 10b thereafter compiles the coherency responses and votes shared during the ARespIn period. Finally, as shown at block 114, node controller 20 of processing node 10b transmits an I-command containing a shared response and the transaction tag to processing node 10a via I-command channel 31 and sources the requested cache line to processing node 10a via data-out channel 28. Thereafter, the process terminates at block 116.

As has been described, the present invention provides an improved NUMA computer system and an improved third node communication methodology in a NUMA computer system. In accordance with the present invention, transactions that could possibly require third node involvement are buffered at a third node that is neither the source nor target of a communication transaction. In the event that involvement of the third node is required, the transaction can be accessed from the buffer rather than retransmitted over the shared address bus within the node interconnect. In this manner, traffic on the bandwidth-limited portion of node interconnect is advantageously reduced, thereby decreasing communication latency and enhancing overall system performance.

While the invention has been particularly shown and described with reference to a preferred embodiment, it will be understood by those skilled in the art that various changes in form and detail may be made therein without departing from the spirit and scope of the invention. For example, while the present invention has been described with respect to a preferred embodiment in which node interconnect is a bus-based fabric (e.g., shared bus), it should be understood that in alternative embodiments the node interconnect could be implemented with a point-to-point broadcast fabric, such as a crossbar switch. In this embodiment, the transaction buffer for each node and the associated control logic would be coupled to the crossbar switch rather than incorporated within each node.

What is claimed is:

1. A non-uniform memory access (NUMA) computer system, comprising:
   an interconnect;
   at least first, second, and third processing nodes coupled to said interconnect, each of said first, second, and third processing nodes including at least one processor and a local system memory;

a transaction buffer, coupled to said interconnect, that stores communication transactions transmitted on said interconnect that are both initiated by and targeted at a processing node other than said third processing node; and buffer control logic, coupled to said transaction buffer, which in response to a determination that a particular communication transaction originally targeting processing node other than said third processing node should be processed by said third processing node, causes said particular communication transaction to be retrieved from said transaction buffer and processed by said third processing node.

2. The NUMA computer system of claim 1, wherein said interconnect includes a broadcast interconnect and said transaction buffer and said buffer control logic form a portion of said third processing node.

3. The NUMA computer system of claim 1, said transaction buffer storing only communication transactions possibly requiring processing by said third processing node.

4. The NUMA computer system of claim 1, each communication transaction in said transaction buffer being accessed by an associated transaction tag.

5. The NUMA computer system of claim 4, said second processing node further comprising a node controller that, in response to receipt of said particular communication transaction, said particular communication transaction targeting said second processing node, determines if said particular communication transaction should be processed by said third processing node and, if so, transmits a transaction tag associated with said particular communication transaction to said buffer control logic.

6. The NUMA computer system of claim 1, wherein said interconnect includes a non-blocking interconnect that conveys said transaction tag from second processing node to said buffer control logic.

7. The NUMA computer system of claim 1, wherein said buffer control logic transmits a reissue command to another processing node in response to a determination that a communication transaction that was originally targeted at another processing node and that should be processed by said third processing node is not stored within said transaction buffer.

8. A method of operating a non-uniform memory access (NUMA) computer system including at least first, second, and third processing nodes coupled to an interconnect, each of said first, second, and third processing nodes including at least one processor and a local system memory, said method comprising:

transmitting a communication transaction on said interconnect from said first processing node that targets said second processing node;

receiving said communication transaction at both said second processing node and at a transaction buffer coupled to said interconnect;

storing said communication transaction in said transaction buffer; and retrieving said communication transaction from said transaction buffer and processing said communication transaction at said third processing node in response to a determination that said communication transaction should be processed by said third processing node.

9. The method of claim 8, said interconnect including a broadcast interconnect and said third processing node including said transaction buffer and said buffer control logic, wherein said step of receiving said communication transaction at said transaction buffer comprises receiving said communication transaction at said third processing node.

10. The method of claim 8, wherein storing said communication transaction in said transaction buffer comprises storing said communication transaction in said transaction buffer if said communication transaction possibly requiring processing by said third processing node.

11. The method of claim 8, wherein retrieving said communication transaction from said transaction buffer comprises retrieving said communication transaction from said transaction buffer utilizing an associated transaction tag.

12. The method of claim 8, and further comprising:

in response to receipt of said particular communication transaction at said second processing node, said particular communication transaction targeting said second processing node, determining at said second processing node if said particular communication transaction should be processed by said third processing node; and in response to a determination that said particular communication transaction should be processed by said third processing node, transmitting an indication of said determination to said transaction buffer.

13. The method of claim 12, wherein transmitting an indication of said determination comprises transmitting said indication via a non-blocking interconnect.

14. The method of claim 8, and further comprising:

transmitting a reissue command from said buffer control logic to said second processing node in response to a determination that a communication transaction that originally targeted said second processing node and that should be processed by said third processing node is not stored within said transaction buffer.

* * * * *